US008720733B2

(12) United States Patent
Rayudu

(10) Patent No.: US 8,720,733 B2
(45) Date of Patent: May 13, 2014

(54) COOKING DEVICE WITH A COOKING SURFACE DEFINED BY A PLURALITY OF VERTICALLY MOVEABLE MEMBERS

(76) Inventor: Ranga Rayudu, Troy, MI (US)

(*) Notice: Subject to any disclaimer, the term of this patent is extended or adjusted under 35 U.S.C. 154(b) by 393 days.

(21) Appl. No.: 13/075,537

(22) Filed: Mar. 30, 2011

(65) Prior Publication Data

US 2012/0248123 A1 Oct. 4, 2012

(51) Int. Cl.
*A47J 27/00* (2006.01)
*A47J 36/00* (2006.01)

(52) U.S. Cl.
CPC .............. *A47J 27/002* (2013.01); *A47J 36/00* (2013.01)
USPC .......................................... 220/573.1; 99/340

(58) Field of Classification Search
CPC ....... A47J 36/00; A47J 27/0802; A47J 27/08; A47J 27/16; A47J 27/002
USPC .............. 220/573.1, 912, 628, 629, 624, 623, 220/600, 573.3; 99/340, 324
See application file for complete search history.

(56) References Cited

U.S. PATENT DOCUMENTS 1,756,787 A * 4/1930 Goughnour .................... 126/369
7,775,392 B2 * 8/2010 Millsap et al. ............. 220/573.1

* cited by examiner

*Primary Examiner* — Robert J Hicks
(74) *Attorney, Agent, or Firm* — Harness, Dickey & Pierce, P.L.C.

(57) ABSTRACT

A cooking device includes a cooking surface defined by a plurality of vertically adjustable members. Each vertically adjustable member of the plurality of vertically adjustable members is independently movable between a retracted position and an extended position. In certain applications, the cooking device may further include a cooking base and a sidewall upwardly extending from the cooking base.

19 Claims, 3 Drawing Sheets

COOKING DEVICE WITH A COOKING SURFACE DEFINED BY A PLURALITY OF VERTICALLY MOVEABLE MEMBERS

FIELD

The present disclosure generally relates to a cooking device. More particularly, the present disclosure relates to a cooking device with a cooking surface defined by a plurality of vertically adjustable members. The present disclosure also relates to a method of cooking with a cooking device having a cooking surface defined by a plurality of vertically adjustable members.

DISCUSSION

The statements in this section merely provide background information related to the present disclosure and may not constitute prior art.

Various types of cooking devices are well known. It is generally desirable that a cooking device function to provide an even source of heat to an item to be cooked. It is also desirable that the cooking device be relatively easy to clean.

While known cooking devices have proven to be generally suitable for their intended purposes, a need for continuous improvement in the relevant area remains.

SUMMARY

In accordance with one particular aspect, the present teachings provide a cooking device having a cooking surface defined by a plurality of vertically adjustable members. Each vertically adjustable member of the plurality of vertically adjustable members is independently movable between a retracted position and an extended position. In certain applications, the cooking device may include a cooking base and a sidewall upwardly extending from the cooking base.

In accordance with another particular aspect, the present teachings provide a cooking device having a cooking base and a sidewall upwardly extending from the cooking base. The cooking device further includes a horizontal plate extending across the cooking device and defining a pressurizable cavity between the horizontal plate and the cooking base. The cooking device further includes a plurality of base members carried by the horizontal plate and in fluid communication with the pressurizable cavity. A corresponding plurality of vertically adjustable members is provided. Each vertically adjustable member is telescopically associated with a corresponding base member such that an increase in pressure within the pressurizable cavity upwardly advances each vertically adjustable member from a retracted position to an extended position.

In accordance with yet another aspect, the present teachings provide a cooking device including a cooking base, a sidewall and a cooking surface. The sidewall upwardly extends upwardly from the cooking base. The cooking surface is defined by a plurality of vertically adjustable members. A cavity is defined between the cooking surface and the cooking base. The vertically adjustable members are each moveable between a retracted position and an extended position.

In accordance with still yet another particular aspect, the present teachings provide a method of cooking with a cooking device having an adjustable cooking surface defined by a plurality of adjustable members. The method includes operatively associating the vertically adjustable members with a pressurizable cavity. The method additionally includes pressurizing the pressurizable cavity. The method further includes upwardly advancing the vertically adjustable members from retracted positions to extended positions with an increased pressure within the pressurizable cavity. The method still further includes heating an item to be cooked with the adjustable cooking surface.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only and are not intended to limit the scope of the present disclosure in any way.

DETAILED DESCRIPTION

Figure 1:
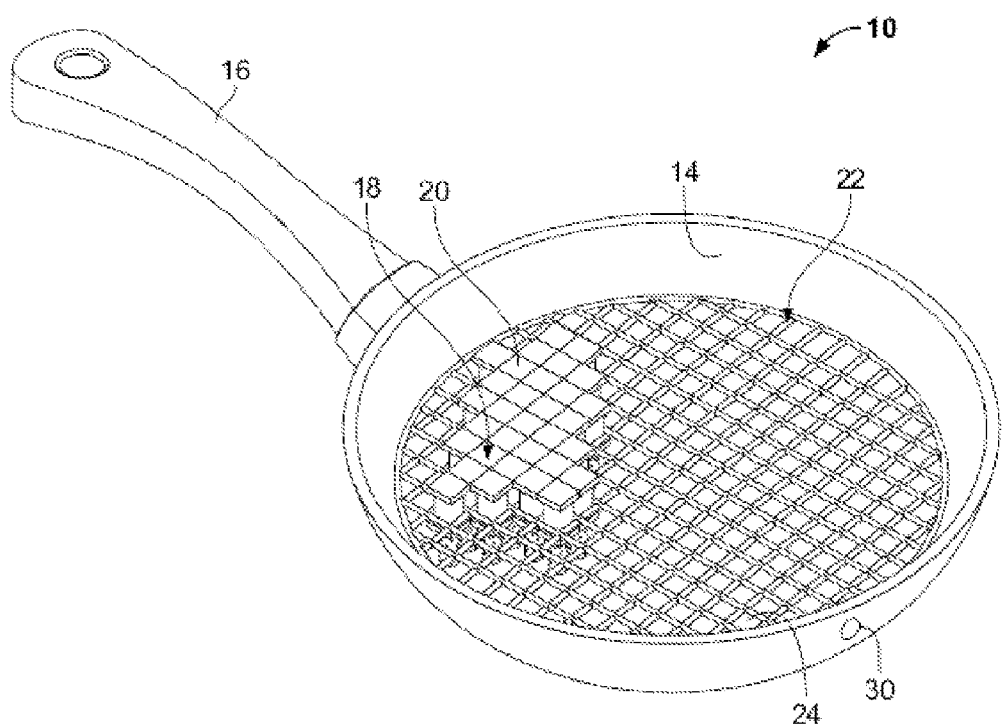
FIG. 1 is a perspective view of a cooking device in accordance with the principles of the present disclosure, the cooking device including a cooking surface defined by a plurality of vertically displaceable members, some of the vertically displaceable members being removed for purposes of illustration.

The following description is merely exemplary in nature and is not intended to limit the present disclosure, application or uses. It should be understood that throughout the drawings, corresponding reference numerals indicate like or corresponding parts and features.

With initial reference to FIGS. 1-5A of the drawings, a cooking device having an adjustable cooking surface in accordance with the teachings of the present invention is illustrated. The cooking device is generally identified at reference character 10. In the embodiment illustrated, the cooking device 10 is conventionally illustrated to include a cooking base 12 and a sidewall 14 upwardly extending from the cooking base 12. Also conventionally, a handle 16 radially extends from the sidewall 14 of the cooking device 10.

In accordance with the present teachings, the cooking device 10 includes a cooking surface 18 horizontally extending there across. The cooking surface 18 is defined by a plurality of vertically adjustable members 20. As will be appreciated further below, each of the vertically adjustable members 20 is independently movable between a retracted position and an extended position.

In the particular embodiment illustrated, the cooking device 10 is illustrated to include a grid 22 or interwoven structure that may provide a fluid-tight arrangement with the plurality of vertically adjustable members 20. As shown, the grid 22 may include a first plurality of spaced apart wires extending across the cooking device 10 in a first direction and a second plurality of wires extending across the cooking device 10 in a second direction. The first direction is substantially perpendicular to the second direction. The first and second pluralities of wires of the grid 22 cooperate to define a plurality of openings 24 for movably receiving the vertically adjustable members 20. In certain applications, it may be desirable to provide an arrangement for tensioning the wires of the grid 22 for purposes of maintaining an air-tight relationship with the vertically adjustable members 20. Alternatively, the grid 22 may be defined by a plate formed to include a plurality of openings for receiving the members 20.

As particularly shown in FIG. 1, the plurality of vertically adjustable members 20 are illustrated upwardly displaced to their extended positions. Many of the vertically adjustable members 20 are removed from this figure for purposes of illustration. In this regard, it will be understood that cooking surface 18 defined by the vertically adjustable members 20 extends completely across the cooking device 10.

Figure 2:
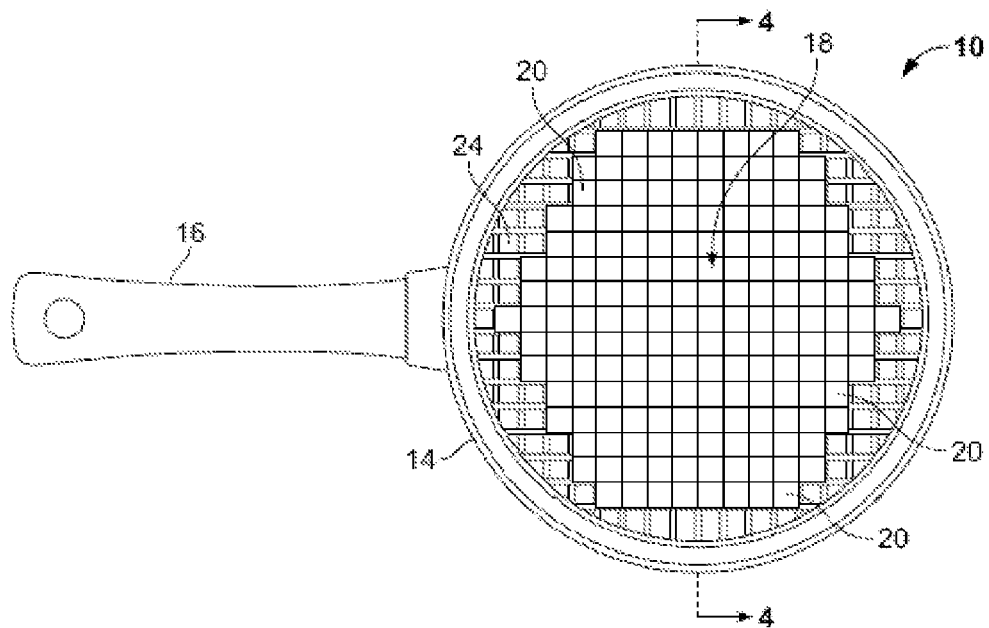
FIG. 2 is a top view of a cooking device in accordance with the principles of the present disclosure, the cooking device again shown with some of the vertically displaceable members removed for purposes of illustration.

FIG. 2 illustrates the plurality of vertically adjustable members 20 in their retracted positions. Again, a number of the vertically adjustable members 20 have been removed for purposes of illustration.

Figure 3:
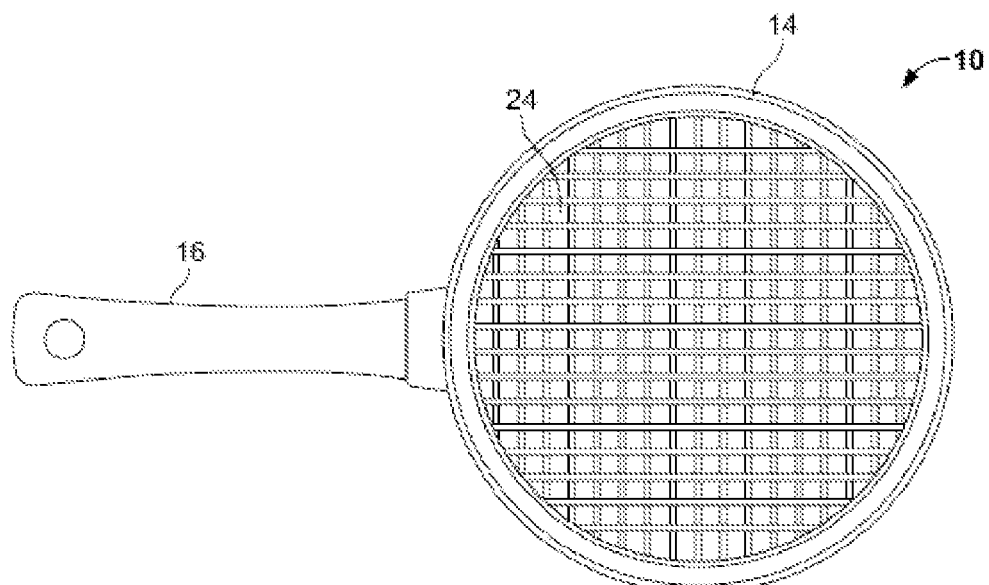
FIG. 3 is a top view similar to FIG. 2, all of the vertically displaceable members removed for purposes of illustration.

In FIG. 3, all of the vertically adjustable members 20 are removed for purposes of fully illustrating the grid 22.

Figure 4:
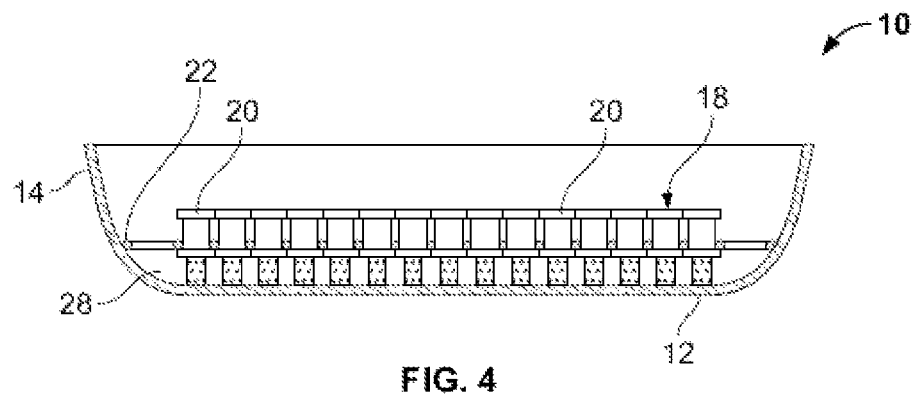
FIG. 4 is a cross-sectional view taken along the line 4-4 of FIG. 2.

With particular reference to the cross-sectional view of FIG. 4 and FIG. 5, the teachings of the present invention as they relate to the construction and operation of the vertically adjustable members 20 and associated structure of the cooking device 10 will be further described. As illustrated, each vertically adjustable member 20 may be operatively associated with a base member 26. The base members 26 may be carried by the cooking base 12 of the cooking device 10. The vertically adjustable members 20 may be movably associated with the grid 22 in a fluid-tight arrangement such that a pressurizable cavity is defined between the grid 22 and the cooking base 12.

Each base member 26 is hollow and telescopically associated with one of the vertically adjustable members 20. In the embodiment illustrated, the base members 26 are perforated so that when the air within the pressurizable cavity 28 is pressurized, the pressurized air is forced into the hollow base member 26 and upwardly advances the associated vertically adjustable member 20. The air within the cavity 28 may be pressurized by heating of the cooking base 12.

As illustrated in FIG. 1, the cooking device 10 may include a valve 30. The valve 30 may be opened and closed in a conventional manner to release or retain pressure within the cavity 28. In the embodiment illustrated, the valve 30 is conventional in construction and operation and can simply be manually operated. In other applications, it may be desirable to provide controls on the handle 16 of the cooking device 10 for opening and closing the valve 30 or some similar structure.

In the embodiment illustrated, each vertically adjustable member 20 has a main body portion 32 and a head. The main body portion 32 may have a generally rectangular or generally square cross section. It will be appreciated by those skilled in the art, however, that any other suitable geometry may be incorporated within the scope of the present teachings. Significantly, the geometry of the main body portion 32 of the vertically adjustable member 20 will generally correspond with the geometry of the openings 24 defined by the grid 22.

The heads of the vertically adjustable members 20 may be slightly enlarged relative to the main body portion 32 to define a flange 34A. In this manner, the heads or flanges 34 substantially define a continuous cooking surface 18. Further explained, the enlarged heads 34 accommodate the distance between openings 24 in the grid 22 necessitated by the diameters of the wires. It will be understood, however, that the heads 34 need not be enlarged and the cooking surface 18 may be interrupted by the small gaps between adjacent vertically adjustable members 20.

As illustrated, the vertically adjustable members 20 may additionally include a second flange 34 at their lower ends. The enlarged portion or flange 34 defines a stop against the grid and thereby limits vertical extension. As shown in the cross-sectional view of FIG. 4, for example, the lower flanges 34 may abut the grid 22 when the vertically adjustable members 20 are upwardly translated.

In operation, the valve 30 is closed and a source of heat is applied to the cooking base 12. The source of heat pressurizes air within the cavity 28. The pressurized air enters the perforations of the base members 26 and upwardly advances the vertically adjustable members 20 from their retracted positions (as shown in FIG. 2) to their extended positions (as shown in FIGS. 1 and 4). The members 20 may extend above, equal to or below the plane of the grid 22.

The item to be cooked is carried by the cooking surface 18 collectively defined by the heads 34 of the vertically adjustable members 20. The pressure upwardly advancing the vertically adjustable members 20 is such that the weight of the item to be cooked may typically serve to downwardly displace some of the vertically adjustable members 20 in such a manner that more surface area of the cooking surface 18 is in contact with the item to be cooked as compared to a conventional cooking device. The source of heat may be transferred from the cooking base 12 and the sidewall 14 to the heads 34 of the vertically adjustable members 20.

When cooking is completed and the source of heat is removed from the cooking device, the vertically adjustable members 20 are allowed to independently return to their retracted positions. This independent retraction of the vertically adjustable members 20 may serve to break up any cooking residue remaining on the cooking surface 18 and thereby facilitate cleaning of the cooking device 10.

Figure 5A:
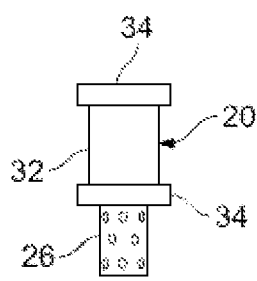
FIG. 5A is a side view of one of the vertically displaceable members operatively associated with a cooperating base member.
Figure 5B:
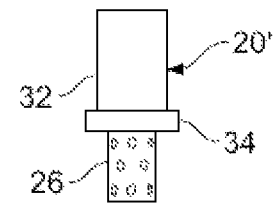
FIG. 5B is a side view similar to FIG. 5A illustrating an alternative vertically displaceable member in accordance with the principles of the present disclosure.

With reference to FIG. 5B, an arrangement similar to FIG. 5A and including an alternative vertically displaceable member 20 is illustrated. The arrangement of FIG. 5B differs from FIG. 5A in that the enlarged head portion 34 is omitted. In other applications, the vertically adjustable member may be formed without either of the flanges 34.

Figure 6:
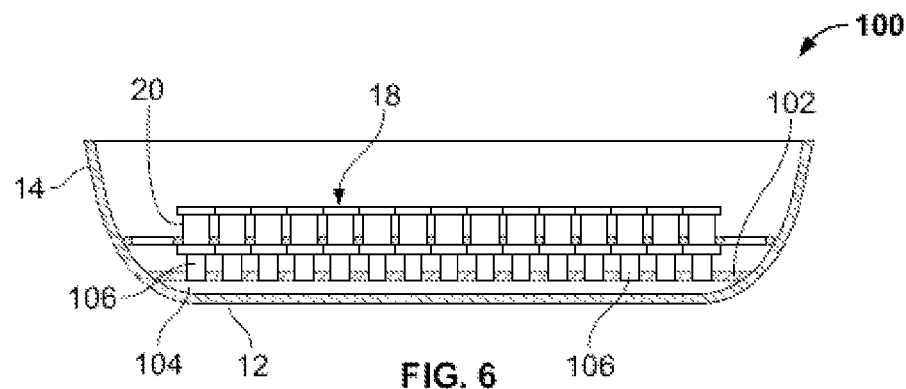
FIG. 6 is a cross-sectional view similar to FIG. 4, illustrating another cooking device in accordance with the principles of the present disclosure.

Turning to the cross-sectional view of FIG. 6, another cooking device constructed in accordance with the present teachings is illustrated and generally identified at reference character 100. In view of the similarities between the cooking device 100 and the cooking device 10, like reference characters will be used to identify substantially identical elements. To the extent not otherwise described herein, it will be understood that the various elements of the cooking device 100 are identical to corresponding elements of the cooking device 10.

The cooking device 100 differs from the cooking device 10 in that the cooking device 100 additionally incorporates a horizontal plate 102 extending across the cooking device 100. A pressurizable cavity 104 is defined between the cooking base 12 and the horizontal plate 102.

A plurality of base members 106 are carried by the horizontal plate. The base members 26 are in fluid communication with the cavity 104. In this embodiment, the base members 106 are hollow but not perforated.

A corresponding plurality of vertically adjustable members 20 are telescopically associated with the plurality of base members 106. An increase in pressure within the cavity 104 sends pressurized air up into the hollow base members 106 to upwardly advance the associated vertically adjustable members from their retracted positions to their extended positions.

As illustrated, the cooking device 100 may additionally incorporate a grid 22 similar to the grid described above. In this regard, the grid 22 may serve to guide the vertically adjustable members 20. In certain applications, the grid 22 may be eliminated.

In the particular embodiments illustrated, the heads 34 of the vertically adjustable members 20 are approximately 0.25 inch squares. It will be appreciated, however, that other dimensions may be employed within the scope of the present teachings. The heads 34 need not be uniform in shape. For example, some heads 34 may be square while others rectangular. Heads 34 of vertically adjustable members 20 at the periphery of the cooking surface 18 may include a curved outer surface to conform with the adjacent sidewall. In certain applications, the heads may be treated with a non-stick surface. The grid 22 and the vertically adjustable members 20 may be constructed with any suitable material. By way of example, but not limitation, suitable materials may include stainless steel, aluminum iron, copper, glass, ceramic and combinations thereof.

The exemplary embodiments described herein are provided in the form of fry pans. It will be understood that the present teachings are not limited to such an application. In this regard, the present teachings are readily adaptable to any other type of cooking device. The cooking device need not include an upwardly extending sidewall. For example, the cooking device may be a planar griddle.

In other applications, the present teachings may be adapted for non-cooking items such as bowls and the like. By incorporating a surface identical to surface 18 described above, such items may be more readily cleaned. In this regard, movement of the vertically adjustable members 20 may serve to break up residue. In still yet other applications, the present teachings may be adapted to various industrial surfaces to facilitate closing.

The embodiments described herein rely on pressurized air to upwardly move the vertically adjustable members 20. In alternate applications, the members 20 may be manipulated with spring force, magnetic or electromagnetic force or with hydraulic effects of liquid or gas, for example. Portions of the members 20 may be ferromagnetic to allow displacement or heat induction via magnetism. It will be clearly understood that the present teachings may be adapted such that the vertically adjustable members 20 may be alternatively controlled between their retracted and extended positions. The members 20 may be manipulated individually or collectively.

While specific examples and alternatives have been described in the specification and illustrated in the drawings, it will be understood by those skilled in the art that various further changes may be made by and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description and any appended claims.

What is claimed is:

1. A cooking device comprising:
a cooking surface defined by a plurality of vertically adjustable members, each vertically adjustable member of the plurality of vertically adjustable members being independently moveable between a retracted position and an extended position.

2. The cooking device of claim 1, further comprising:
a cooking base; and
a sidewall upwardly extending from the cooking base.

3. The cooking device of claim 1, wherein each vertically adjustable member is telescopically associated with a base member.

4. The cooking device of claim 2, wherein each vertically adjustable member is moveable from its retracted position to its extended position in response to an increase in temperature.

5. The cooking device of claim 2, wherein each vertically adjustable member is associated with a base member, the base members being perforated and hollow such that a source of pressurized air enters the base member to move the associated vertically adjustable member to its extended position.

6. The cooking device of claim 2, further comprising a grid having a first plurality of spaced apart wires extending across the cooking device in a first direction and a second plurality of wires extending across the cooking device in a second direction, the first direction being substantially perpendicular to the second direction, the first and second pluralities of wires cooperating to define a plurality of openings for moveably receiving the vertically adjustable members.

7. The cooking device of claim 6, wherein the vertically adjustable members are in a fluid-tight association with the grid.

8. The cooking device of claim 1, wherein the vertically adjustable members each have a main body portion with a generally square cross section.

9. The cooking device of claim 7, wherein the vertically adjustable members each have an enlarged head portion such that a substantially continuous cooking surface is defined by the plurality of vertically adjustable members.

10. The cooking device of claim 7, wherein a pressurizable cavity is defined between the cooking base and the grid.

11. The cooking device of claim 2, further comprising a horizontal plate extending across the cooking device and disposed generally parallel to the cooking base, a pressurizable cavity defined between the cooking base and the horizontal plate, the horizontal plate carrying a plurality of base members in fluid communication with the pressurizable cavity and each telescopically associated with one of the vertically adjustable members of the plurality of vertically adjustable members.

12. A cooking device comprising:
a cooking base;
a sidewall upwardly extending from the cooking base;
a cooking surface defined by a plurality of vertically adjustable members; and
a cavity defined between the cooking surface and the cooking base;

wherein the vertically adjustable members are each movable between a retracted position and an extended position.

13. The cooking device of claim 12, wherein the cooking surface is generally parallel to the cooking base.

14. The cooking device of claim 12, wherein the cavity may include an opening for the venting of air and the control of air pressure.

15. The cooking device of claim 12, further comprising a hollow handle extending from the sidewall, an interior of the handle in fluid communication with the cavity.

16. A method of cooking comprising:
providing a cooking device including a cooking surface defined by a plurality of vertically adjustable members, each vertically adjustable member of the plurality of vertically adjustable members being independently moveable between a retracted position and an extended position;
operatively associating the vertically adjustable members with a pressurizable cavity;
pressurizing the pressurizable cavity;
upwardly advancing the vertically adjustable members from the retracted positions to the extended positions with an increased pressure with the pressurizable cavity; and
heating an item to be cooked with the adjustable cooking surface.

17. The method of cooking with the cooking device of claim 16, wherein pressurizing the pressurizable cavity includes heating the air within the cavity.

18. The method of cooking with the cooking device of claim 16, wherein upwardly advancing the vertically adjustable members includes independently moving the vertically adjustable members.

19. The method of cooking with the cooking device of claim 16, wherein pressurizing the pressurizable cavity includes heating the air within the pressurizable cavity.

* * * * *